(12) United States Patent
Murakami et al.

(10) Patent No.: US 12,491,229 B2
(45) Date of Patent: Dec. 9, 2025

(54) STABILIZED PEPTIDE COMPOSITION

(71) Applicant: Shionogi & Co., Ltd., Osaka (JP)

(72) Inventors: Takashi Murakami, Toyonaka (JP); Kazuyuki Takata, Toyonaka (JP); Yoshie Niwa, Toyonaka (JP); Shuichi Hatano, Amagasaki (JP); Hidenori Kawasaki, Amagasaki (JP); Satoko Fujita, Amagasaki (JP)

(73) Assignee: SHIONOGI & CO., LTD., Osaka (JP)

( * ) Notice: Subject to any disclaimer, the term of this patent is extended or adjusted under 35 U.S.C. 154(b) by 794 days.

(21) Appl. No.: 17/851,339

(22) Filed: Jun. 28, 2022

(65) Prior Publication Data

US 2022/0347259 A1 Nov. 3, 2022

Related U.S. Application Data

(62) Division of application No. 15/527,938, filed as application No. PCT/JP2015/082179 on Nov. 17, 2015, now abandoned.

(30) Foreign Application Priority Data

Nov. 18, 2014 (JP) ................................. 2014-233604

(51) Int. Cl.
| | |
|---|---|
| A61K 38/08 | (2019.01) |
| A61K 9/107 | (2006.01) |
| A61K 38/00 | (2006.01) |
| A61K 47/02 | (2006.01) |
| A61K 47/10 | (2017.01) |
| A61K 47/26 | (2006.01) |
| A61K 47/36 | (2006.01) |
| C07H 3/04 | (2006.01) |
| C07K 7/06 | (2006.01) |

(52) U.S. Cl.
CPC .............. *A61K 38/08* (2013.01); *A61K 9/107* (2013.01); *A61K 38/00* (2013.01); *A61K 47/02* (2013.01); *A61K 47/10* (2013.01); *A61K 47/26* (2013.01); *A61K 47/36* (2013.01); *C07H 3/04* (2013.01); *C07K 7/06* (2013.01)

(58) Field of Classification Search
CPC ........ A61K 38/08; A61K 47/10; A61K 47/26; A61K 9/107; A61K 47/02; A61K 38/00; A61K 47/36; C07H 3/04; C07K 7/06
See application file for complete search history.

(56) References Cited

U.S. PATENT DOCUMENTS

| | | |
|---|---|---|
| 2003/0180287 A1 | 9/2003 | Gombotz et al. |
| 2009/0202576 A1 | 8/2009 | Tahara et al. |
| 2010/0028373 A1 | 2/2010 | Fujioka et al. |
| 2015/0359864 A1 | 12/2015 | Himi et al. |

FOREIGN PATENT DOCUMENTS

| | | |
|---|---|---|
| EP | 2 692 350 A2 | 5/2014 |
| JP | 2007-532682 | 11/2007 |
| JP | 2014-515367 | 6/2014 |
| WO | 1999/12568 A1 | 3/1999 |
| WO | 2003/072060 A2 | 9/2003 |
| WO | 2003/080108 A1 | 10/2003 |
| WO | 2006/090810 A3 | 8/2006 |
| WO | 2007/076354 A2 | 7/2007 |
| WO | 2008/047473 A1 | 4/2008 |
| WO | 2008/071394 A1 | 6/2008 |
| WO | 2009/153992 A1 | 12/2009 |
| WO | 2011/109365 A2 | 9/2011 |
| WO | 2011/163647 A2 | 12/2011 |
| WO | 2013/059407 A1 | 4/2013 |
| WO | 2013133405 A1 | 9/2013 |

OTHER PUBLICATIONS

International Search Report dated Feb. 16, 2016 for International Application No. PCT/JP2015/082179, 3 pages.
Carpenter et al., "Rational Design of Stable Lyophilized Protein Formulations: Some Practical Advice", Pharmaceutical Research, 1997, vol. 14, No. 8, pp. 969-975.
Suzuki et al., "Multiple therapeutic peptide vaccines consisting of combined novel cancer testis antigens and anti-angiogenic peptides for patients with non-small cell lung cancer", Journal of Translational Medicine, 2013, vol. 11, No. 97, pp. 1-10.
Score Search Results for SEQ ID No. 1, from http://score.uspto.gov/...eqid=09323b6782d4b7e8&ItemName=20180802_120021_us_15-527-938-1.minpct75.rup&ItemType=4&startByte=0, Aug. 2, 2018, pp. 1-50.
Score Search Results for SEQ ID No. 2, from http://score.uspto.gov/...eqid=09323b6782d4b7e8&ItemName=20180802_120021_us_15-527-938-2.minpct75.rup&ItemType=4&startByte=0, Aug. 2, 2018, pp. 1-50.
Score Search Results for SEQ ID No. 3, from http://score.uspto.gov/...eqid=09323b6782d4b7e8&ItemName=20180802_120021_us_15-527-938-3.minpct75.rup&ItemType=4&startByte=0, Aug. 2, 2018, pp. 1-47.
Score Search Results for SEQ ID No. 4, from http://score.uspto.gov/...eqid=09323b6782d4b7e8&ItemName=20180802_120021_us_15-527-938-4.minpct75.rup&ItemType=4&startByte=0, Aug. 2, 2018, pp. 1-50.

(Continued)

*Primary Examiner* — Li N Komatsu
(74) *Attorney, Agent, or Firm* — MH2 Technology Law Group, LLP

(57) ABSTRACT

Provided herein is a peptide composition that is highly stable and can be stored long term, said composition containing one or more types of peptides having an amino acid sequence represented by any of SEQ ID Nos. 1-5, or a peptide in which one or two of the amino acids of the abovementioned peptides are independent and may be substituted, deleted or added, and saccharides and an inorganic salt.

4 Claims, 6 Drawing Sheets

Specification includes a Sequence Listing.

(56) References Cited

OTHER PUBLICATIONS

Sources of Sucrose Sugar, Livestrong.com, Oct. 3, 2017, p. 1.
Sodium Chloride, from https://www.chemicalsafetyfacts.org/sodium-chloride/, 2018, pp. 1-3.
Ken-Ichi Izutsu, "Stabilization of Therapeutic Proteins by Chemical and Physical Methods", Molecular Biology 308: Therapeutic Proteins, Methods and Protocols, 2005, pp. 287-292.
Christina Avanti, "Innovative Strategies for Stabilization of Therapeutic Peptides in Aqueous Formualation", TIPharma, 2012, pp. 1-157.
Sigma-Aldrich Co., "Peptide Stability", Peptide Stabililty and Potential Degradation Pathways, Mar. 14, 2010, p. 1.

[Fig. 1]
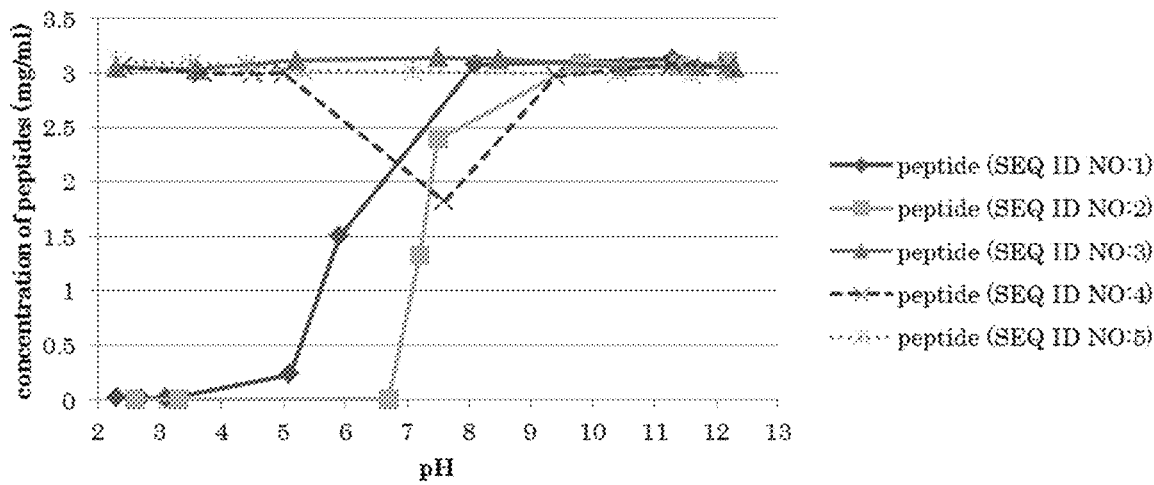
[Fig. 2-1]
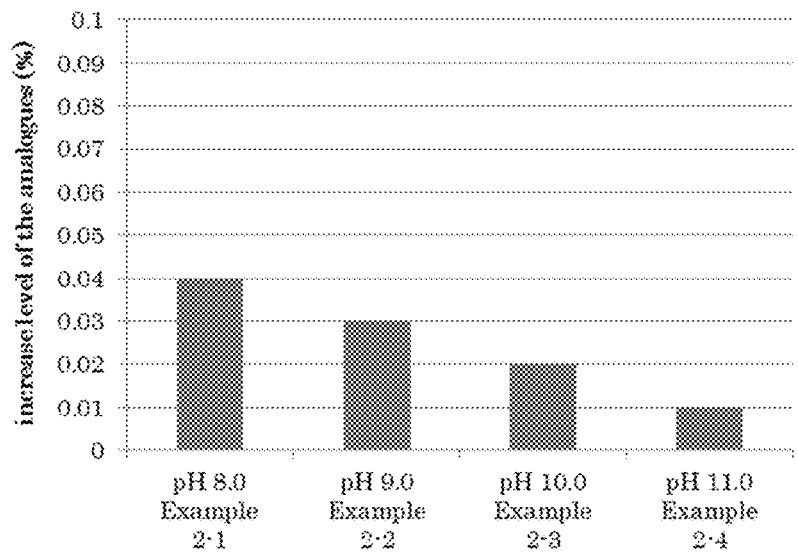

[Fig. 2-2]
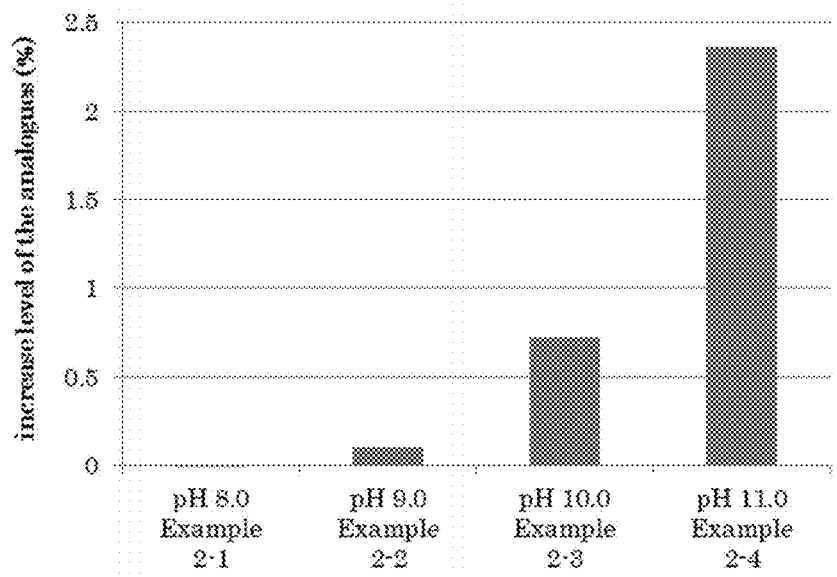
[Fig. 2-3]
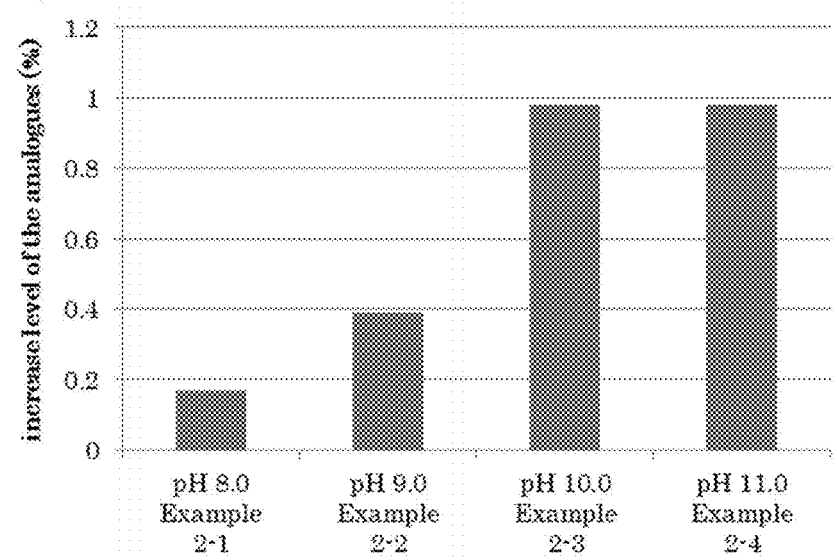

[Fig. 2-4]
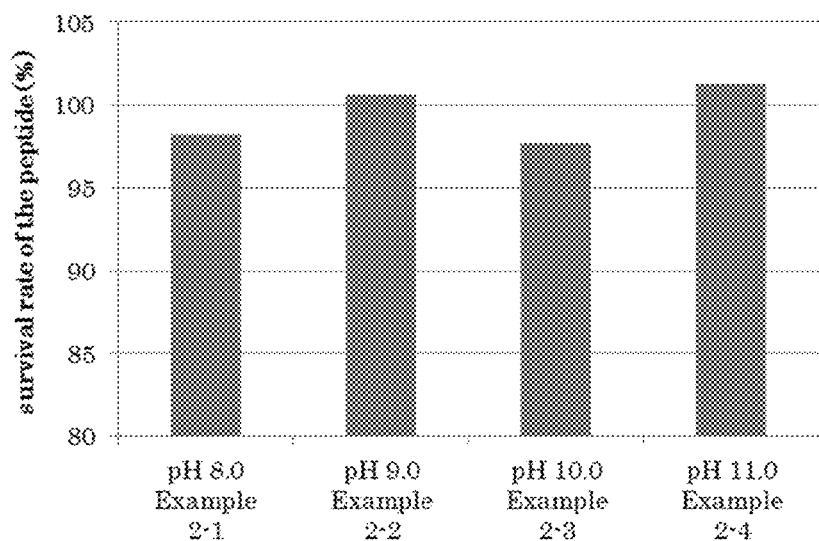
[Fig. 2-5]
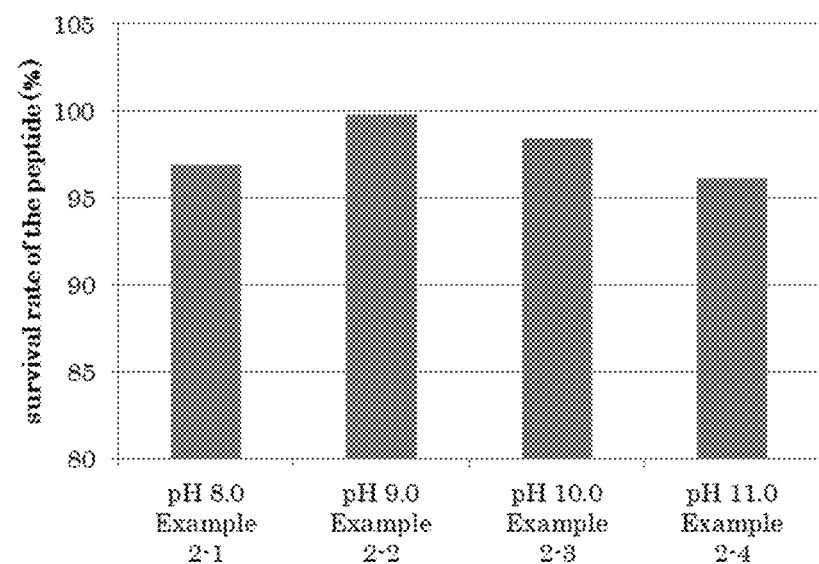

[Fig. 3]
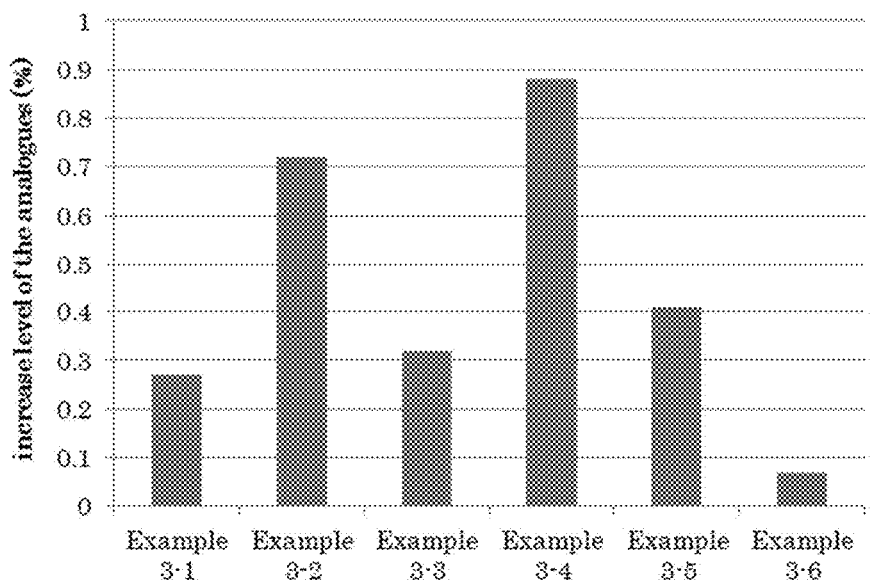
[Fig. 4]
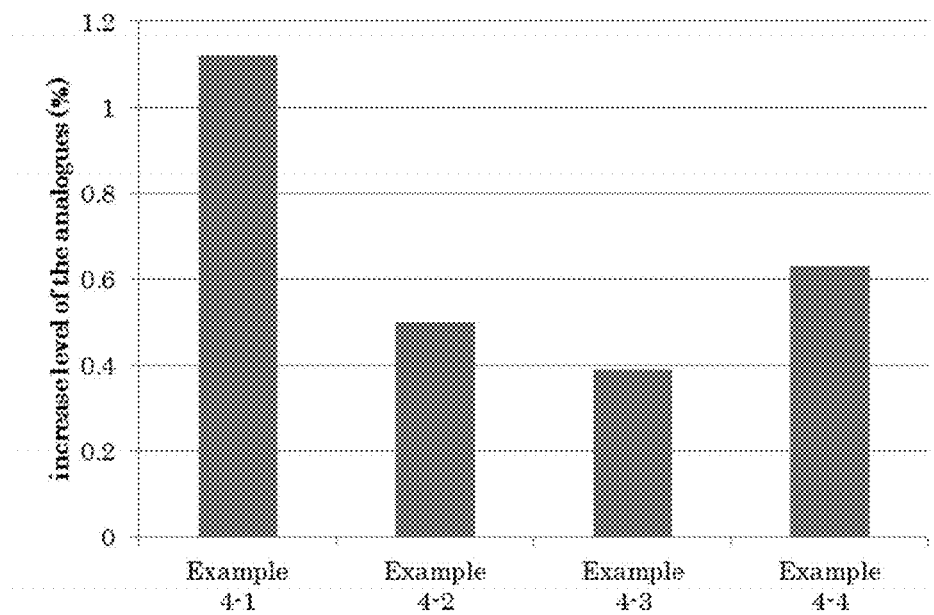

[Fig. 5-1]
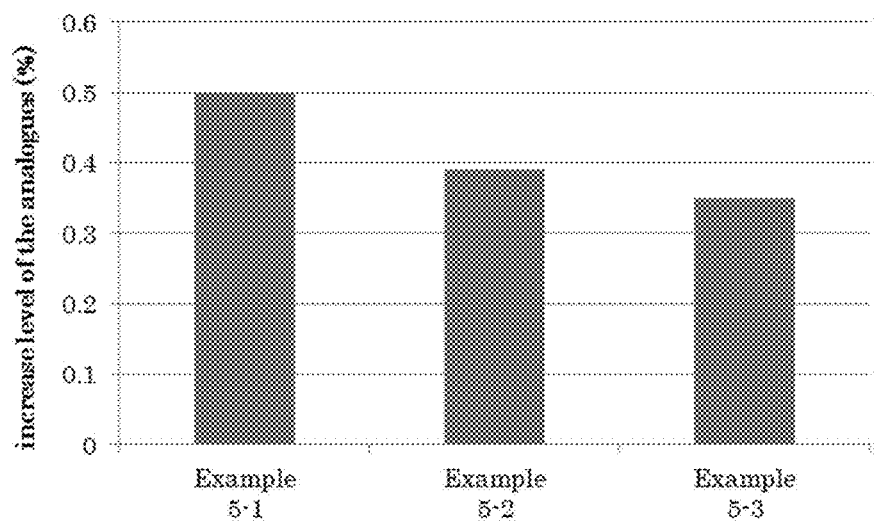
[Fig. 5-2]
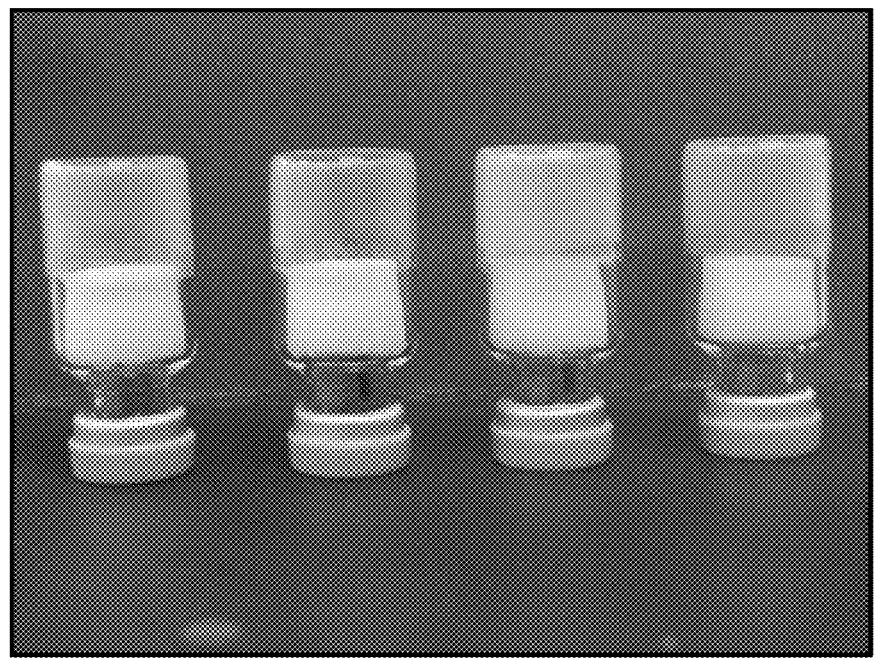

[Fig. 5-3]
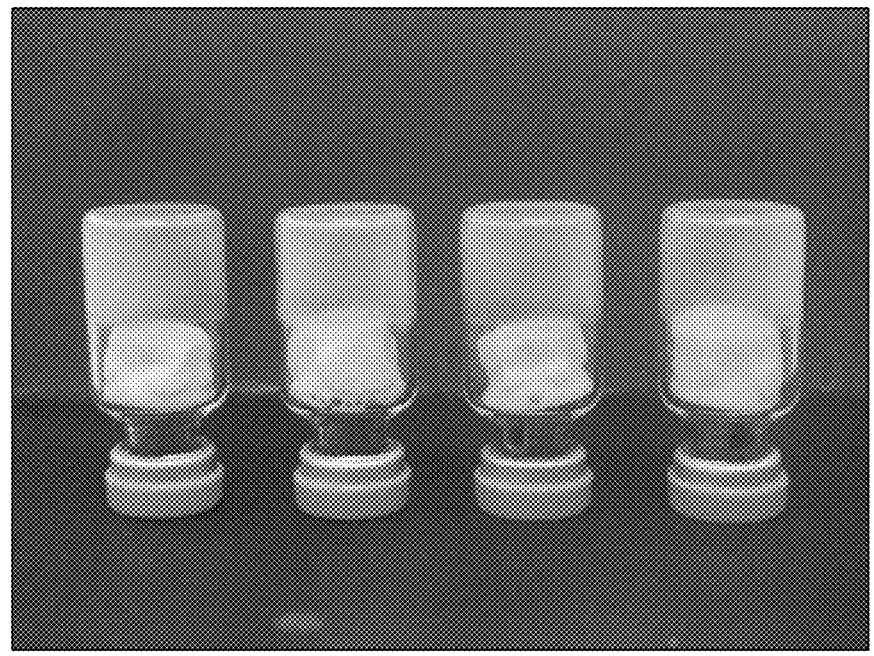
[Fig. 6]
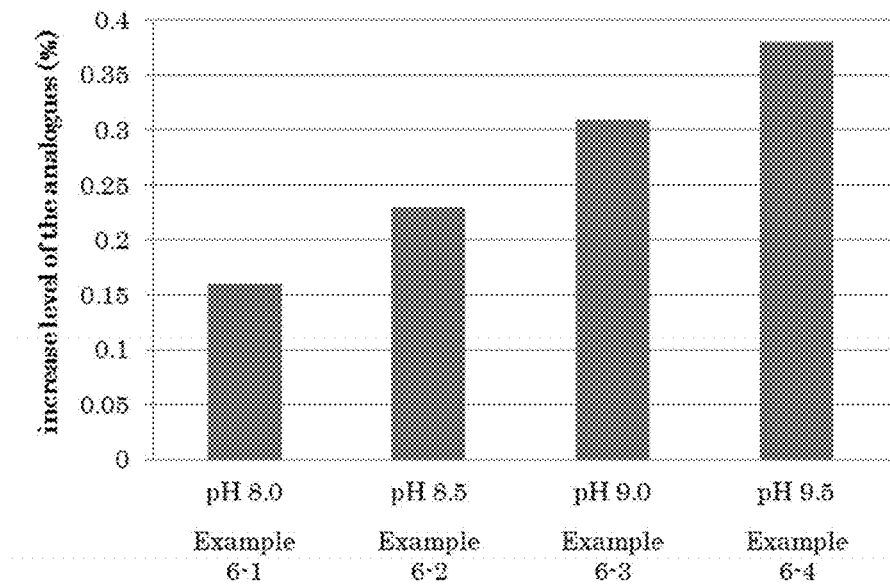

STABILIZED PEPTIDE COMPOSITION

CROSS-REFERENCE TO RELATED APPLICATIONS

This application is a divisional of U.S. application Ser. No. 15/527,938 (pending) filed 18 May 2017, which is a U.S. National Stage application of PCT/JP2015/082179 filed 17 Nov. 2015, which claims priority to Japanese Application No. 2014-233604 filed 18 Nov. 2014, the entire disclosures of which are hereby incorporated by reference in their entireties.

SEQUENCE LISTING

The instant application contains a Sequence Listing which has been submitted electronically in ASCII format and is hereby incorporated by reference in its entirety. Said ASCII copy, created on 10 May 2017, is named 15P00077WO_sequence_list.txt and is 10,000 bytes in size.

TECHNICAL FIELD

The present invention is a composition comprising peptides. The present invention is also a composition comprising multiple types of peptides which is stabilized by containing a saccharide and an inorganic salt, especially sucrose and sodium chloride.

BACKGROUND ART

Many kinds of peptides having cytotoxic T-lymphocyte inducibility are known, which can be used as a vaccine for the treatment or prevention of cancer (Patent Documents 1 to 3). Some peptides generate analogues, which decrease their residual rate in a long term stability test.

The effect of the vaccine preparation comprising multiple types of peptides increases depending on the number of the kinds of the peptides. However, it is difficult to dissolve all peptides entirely if an effective amount of multiple types of peptides is included in the same preparation, because the amount of peptides per unit volume increases. Furthermore, it is difficult to keep all peptides stable, because multiple types of peptides having different characteristics are combined.

A peptide formulation containing sodium carbonate and/or arginine is disclosed as a peptide formulation used as cancer vaccines (Patent Document 4). Furthermore, examples of the injection in which proteins or peptides are stabilized by containing a saccharide such as sucrose and inorganic salts such as sodium chloride are disclosed: the formulation including inactivated dengue virus, poloxamer detergent, sodium chloride, sucrose and the like (Patent Document 5); the formulation including CTLA4Ig molecure, sodium chloride, sucrose and the like (Patent Document 6); the formulation including the VIII factors, detergent, calcium chloride, sucrose, sodium chloride, trisodium citrate, buffer containing no amino acid and the like (Patent Document 7); the formulation including high concentrated protein, sodium chloride, sucrose and the like (Patent Document 8); the formulation including sodium carboxymethylcellulose, sodium chloride, polysorbate 20, Tween 20, 50:50 DL PLG 4A polymer, exendin-4, sucrose and the like (Patent Document 9); the formulation including peptides containing Fc domain, L-arginine, sodium chloride, sucrose and the like (Patent Document 10); the formulation including human serum albumin, sucrose, glutamic acid, sodium chloride, alkali metal phosphate and the like (Patent Document 11); the formulation including heparan N-sulfatase protein, sodium chloride, buffer, polysorbate surfactant, sucrose and the like (Patent Document 12). However, the stability of the peptides is greatly different, if the amino acid sequences of the peptides are different. Therefore, even if a peptide formulation is prepared in accordance with the above-disclosed formulation, it is not predictable whether the stability of the peptide in the formulation is improved.

PRIOR ART REFERENCES

Patent Document

[Patent Document 1] WO2008/047473
[Patent Document 2] WO2006/090810
[Patent Document 3] WO2009/153992
[Patent Document 4] WO2013/133405
[Patent Document 5] JP2014-515367
[Patent Document 6] JP2009-524595
[Patent Document 7] JP2005-530714
[Patent Document 8] JP2013-521296
[Patent Document 9] JP2007-532682
[Patent Document 10] JP2005-527503
[Patent Document 11] JP2001-518447
[Patent Document 12] JP2013-530988

SUMMARY OF THE INVENTION

Problems to be Solved by the Invention

The present invention provides a composition comprising one or more kinds of peptides, which is stable and can be preserved for a long time, and which can be dissolved in water.

Means to Solve the Problems

The inventors of the present invention intensively studied and found that multiple types of peptides in the formulation can be dissolved in water by adding a saccharide and an inorganic salt in the formulation. They also provide a stabilized composition.

The present invention relates to the following items:

[1] A composition comprising one or more kinds of peptides, a saccharide and an inorganic salt, wherein said peptide consists of an amino acid sequence selected from SEQ ID NOs: 1 to 5, or an amino acid sequence that one or two amino acid(s) may be each independently substituted, deleted or added in the amino acid sequence selected from SEQ ID NOs: 1 to 5;

[2] The composition of item [1], wherein the second amino acid from the N-terminus of the amino acid sequence of the peptide is phenylalanine, tyrosine, methionine, tryptophan or threonine;

[3] The composition according to item [1] or [2], wherein the C-terminal amino acid of the amino acid sequence of the peptide is phenylalanine, leucine, isoleucine, tryptophan or methionine;

[4] The composition according to item [1], which comprises five kinds of peptides each consisting of amino acid sequence selected from SEQ ID NOs: 1 to 5;

[5] The composition according to any one of items [1] to [4], wherein the saccharide is one or more selected from the group consisting of monosaccharide, disaccharides and polysaccharide;

[6] The composition according to item [5], wherein the saccharide is one or more selected from the group consisting of glucose, galactose, fructose, sucrose, lactose, maltose, trehalose, dextran and glycerol;

[7] The composition according to item [6], wherein the saccharide is sucrose;

[8] The composition according to any one of items [1] to [7], wherein the inorganic salt is one or more selected from the group consisting of sodium chloride, potassium chloride, magnesium chloride, sodium sulfite and sodium metabisulfite;

[9] The composition according to item [8], wherein the inorganic salt is sodium chloride;

[10] The composition according to any one of items [1] to [9], which is a lyophilized formulation;

[11] The composition according to item [10], wherein the weight of the peptide is 1.0 to 20 mg.

[12] The composition according to item [10], wherein the concentration of the peptide is 0.05 to 1.0% by weight when the total amount is 2.0 g by dissolving the composition in water;

[13] The composition according to any one of items [10] to [12], wherein the weight of the saccharide is 20 to 70 mg;

[14] The composition according to any one of items [10] to [12], wherein the weight ratio of the peptide and the saccharide in the composition is 1:1.7 to 1:29.2;

[15] The composition according to any one of items [10] to [12], wherein the concentration of the saccharide is 1.0 to 3.5% by weight when the total amount is 2.0 g by dissolving the composition with water;

[16] The composition according to any one of items [10] to [15], wherein the weight of the inorganic salt is 0.1 to 3.0 mg;

[17] The composition according to any one of items [10] to [15], wherein the weight ratio of the peptide and the inorganic salt is 1:0.008 to 1:1.25;

[18] The composition according to any one of items [10] to [15], wherein the concentration of the inorganic salt is 0.01 to 0.3% by weight when the total amount is 2.0 g by dissolving the composition in water;

[19] The composition according to any one of items [10] to [18], which is pH 7.0 to 9.5 when the composition is dissolved in water;

[20] The composition according to any one of items [1] to [9], which is a water-in-oil emulsion formulation;

[21] The composition according to item [20], which is prepared from the composition any one of items [10] to [19];

[22] The composition according to any one of items [1] to [21], which is an injection;

[23] The composition according to any one of items [10] to [22], wherein the concentration of oxygen is 0.01% or more and less than 3.0% in the vial;

[24] A method of preparation of an emulsion by mixing the composition according to any one of items [10] to [19] and an adjuvant;

[25] A kit comprising the composition according to any one of items [1] to [23];

[26] A method of manufacturing the lyophilized formulation which comprises at least the following steps:
a) a step of mixing the stable peptides, the saccharide and the inorganic salt in a solution of pH 12.0 or more and less than pH 13.0,
b) a step of adjusting the solution prepared by said step a) to pH 10.0 or more and less than pH 12.0,
c) a step of mixing the less stable peptides in the solution prepared by said step b),
d) a step of adjusting the solution prepared by said step c) to pH 7.0 or more and less than pH 9.0, and
e) a step of lyophilizing the mixture prepared by said step d);

[27] A method of manufacturing the lyophilized formulation which comprises at least the following steps:
a) a step of mixing a peptide consisting of an amino acid sequence of SEQ ID NO: 1, a peptide consisting of an amino acid sequence of SEQ ID NO: 4, sucrose and sodium chloride in a solution of pH 12.0 or more and less than pH 13.0,
b) a step of adjusting the solution prepared by said step a) to pH 10.0 or more and less than pH 12.0 with an acid substance,
c) a step of mixing a peptide consisting of an amino acid sequence of SEQ ID NO: 2, a peptide consisting of an amino acid sequence of SEQ ID NO: 3 and a peptide consisting of an amino acid sequence of SEQ ID NO: 5 to the solution prepared by said step b),
d) a step of adjusting the solution prepared by said step c) to pH 7.0 or more and less than pH 9.0 with an acid substance, and
e) a step of lyophilizing the mixture prepared by said step d);

[28] A method of manufacturing the lyophilized formulation which comprises at least the following steps:
a) a step of mixing a peptide consisting of an amino acid sequence of SEQ ID NO: 1, a peptide consisting of an amino acid sequence of SEQ ID NO: 4, sucrose and sodium chloride in a solution of pH 12.0 or more and less than pH 13.0,
b) a step of adjusting the solution prepared by said step a) to pH 11.0 or more and less than pH 12.0 with an acid substance,
c) a step of mixing a peptide consisting of an amino acid sequence of SEQ ID NO: 2 and a peptide consisting of an amino acid sequence of SEQ ID NO: 3 to the solution prepared by said step b),
d) a step of adjusting the solution prepared by said step c) to pH 9.0 or more and less than pH 11.0 with an acid substance,
e) a step of mixing a peptide consisting of an amino acid sequence of SEQ ID NO: 5 to the solution prepared by said step d),
f) a step of adjusting the solution prepared by said step c) to pH 7.0 or more and less than pH 9.0 with an acid substance, and
g) a step of lyophilizing the mixture prepared by said step f);

[29] The method of manufacturing the lyophilized formulation according to any one of items [26] to [28], which further comprises the step of controlling the oxygen concentration 0.01% or more and less than 3.0% in the vial;

[30] A lyophilized formation prepared by the method according to any one of items [26] to [28];

[31] A composition comprising a peptide consisting of an amino acid sequence of SEQ ID NO: 3, or an amino acid sequence that one or two amino acid(s) may be substituted, deleted or added in the amino acid sequence of SEQ ID NO: 3, and the oxygen concentration is 0.01% or more and less than 3.0% in the vial;

[32] A composition comprising a peptide consisting of an amino acid sequence of SEQ ID NO: 1, an amino acid sequence of SEQ ID NO: 2, an amino acid sequence of SEQ ID NO: 3, an amino acid sequence of SEQ ID NO: 4, an amino acid sequence of SEQ ID NO: 5, sucrose and sodium chloride;

[33] The composition according to item [32], wherein an amino acid sequence of SEQ ID NO: 1 is 1.0 to 2.4 mg, an amino acid sequence of SEQ ID NO: 2 is 1.0 to 2.4 mg, an amino acid sequence of SEQ ID NO: 3 is 1.0 to 2.4 mg, an amino acid sequence of SEQ ID NO: 4 is 1.0 to 2.4 mg, an amino acid sequence of SEQ ID NO: 5 is 1.0 to 2.4 mg, sucrose is 20 to 60 mg and sodium chloride is 1 to 2 mg.

Effect of the Invention

In the present invention, a stable composition is provided which can be preserved a long time, comprising one or more kinds of peptides which can be dissolved in water. Moreover, increasing stability of the peptides is realized by controlling pH of the solution. In other embodiments, increasing stability of the peptides is realized by controlling the concentration of oxygen in the vial.

BRIEF DESCRIPTION OF THE DRAWINGS

FIG. 1 shows pH dependence of solubility of each peptide.

FIG. 2-1 shows the level of increase of the analogues derived from the peptide having an amino acid sequence of SEQ ID NO: 1 compared to just after the preparation after the solution of the each composition which was pH 8 to 11 was incubated for 6 hours at 25° C.

FIG. 2-2 shows the level of increase of the analogues derived from the peptide having an amino acid sequence of SEQ ID NO: 2 compared to just after the preparation after the solution of the each composition which was pH 8 to 11 was incubated for 6 hours at 25° C.

FIG. 2-3 shows the level of increase of the analogues derived from the peptide having an amino acid sequence of SEQ ID NO: 3 compared to just after the preparation after the solution of the each composition which was pH 8 to 11 was incubated for 6 hours at 25° C.

FIG. 2-4 shows the survival rate of the peptide having an amino acid sequence of SEQ ID NO: 4 compared to just after the preparation after the solution of the each composition which was pH 8 to 11 was incubated for 6 hours at 25° C.

FIG. 2-5 shows the survival rate of the peptide having an amino acid sequence of SEQ ID NO: 5 compared to just after the preparation after the solution of the each composition which was pH 8 to 11 was incubated for 6 hours at 25° C.

FIG. 3 shows the level of increase of the analogues derived from the peptide having an amino acid sequence of SEQ ID NO: 3 compared to just after the preparation after the lyophilized formulation containing any one of sucrose, trehalose, glucose, dextran or glycerol was incubated for 2 weeks at 40° C. under 75% humidity.

FIG. 4 shows the level of increase of the analogues derived from the peptide having an amino acid sequence of SEQ ID NO: 3 compared to just after the preparation after the lyophilized formulation containing 30 mg, 60 mg or 100 mg of sucrose was incubated for 3 months at 40° C. under 75% humidity.

FIG. 5-1 shows the level of increase of the analogues derived from the peptide having an amino acid sequence of SEQ ID NO: 3 compared to just after the preparation after the lyophilized formulation containing 30 mg, 60 mg or 100 mg of sodium chloride was incubated for 3 months at 40° C. under 75% humidity.

FIG. 5-2 shows the maintained shape of lyophilized formulation containing 2 mg of sodium chloride.

FIG. 5-3 shows the complete shrunken shape of lyophilized formulation containing 4 mg of sodium chloride.

FIG. 6 shows the level of increase of the analogues derived from the peptide having an amino acid sequence of SEQ ID NO: 3 compared to just after the preparation after the lyophilized formulation whose pH is 8.0, 8.5, 9.0 or 9.5 was incubated for 3 months at 25° C. under 60% humidity.

EMBODIMENTS FOR CARRYING OUT THE INVENTION

Terms used in this description are explained below. Each term, unless otherwise indicated, has the same meaning when it is used alone or together with other terms.

As used herein, "peptide" refers to a polymer of 2 to 100 amino acids. This polymer may be linear, branched, or cyclic. The amino acid may be naturally-occurring, non-naturally-occurring, or may be an altered amino acid. This term can also include an assembly of a plurality of peptide chains into a complex. This term also includes natural or artificially altered amino acid polymers. Such alteration includes disulfide bond formation, glycosylation, lipidation, acetylation, phosphorylation or any other manipulation or alteration (e.g. conversion into a bound body with a labeling component). This definition also includes, for example, peptides including one or two or more analogs of amino acids (e.g. including non-naturally-occurring amino acids), peptide-like compounds (e.g. peptoids) and other alterations known in the art.

As used herein, "peptide cocktail" means a composition containing two or more kinds of peptides.

As used herein, "amino acid" may be naturally-occurring or non-naturally-occurring, as far as the object of the present invention is satisfied.

"Substituted" amino acid results from the substitution of one or more amino acids with different amino acids respectively when compared to the reference amino acid sequence (amino acid sequence of the wild type protein).

"Deleted" amino acid is defined as a change in any of the amino acid sequences in any of the amino acid sequences in which one or more amino acid residues are not present respectively when compared to the reference amino acid sequence (amino acid sequence of the wild type protein).

"Added" amino acid is defined as the addition of one or more amino acid residues in the middle, N-terminal or C-terminal amino acid sequence, when compared to the reference amino acid sequence (amino acid sequence of the wild type protein).

"Stable peptides in the solution condition" means the survival rate of the peptides is 95% or more, preferably 98% or more after the solution of composition normally which is pH 12 is incubated for 6 hours or more at 25° C. under 60% humidity and the level of increase of analogues derived from the peptide having an amino acid sequence of SEQ ID NO: 3 is 0.9% or lesser, preferably 0.8% or lesser, more preferably 0.5% or lesser compared to just after the preparation after the solution of composition normally which is pH 11 is incubated for 6 hours or more at 25° C. under 60% humidity.

"Stable lyophilized peptide formulation" means lyophilized peptide formulation consisting of the peptide having an amino acid sequence of SEQ ID NO: 3 and the level of increase of the analogues derived from the peptide having an amino acid sequence of SEQ ID NO: 3 is 2.0% or lesser, preferably 1.5% or lesser, more preferably 1.0% or lesser compared to just after the preparation after the lyophilized formulation is incubated for 3 months at 25° C.

"Stable peptide cocktail" means the peptide cocktail in which the level of increase of the analogues derived from the peptide having an amino acid sequence of SEQ ID NO: 3 is 1.0% or lesser, preferably 0.5% or lesser, more preferably 0.3% or lesser compared to just after the preparation after the lyophilized formulation is incubated for 3 months at 25° C. under 60% humidity or 1.0% or lesser, preferably 0.5% or lesser, more preferably 0.3% or lesser after the lyophilized formulation is incubated for 2 weeks at 40° C. under 75% humidity or 1.5% or lesser, preferably 1.0% or lesser, more preferably 0.5% or lesser after the lyophilized formulation is incubated for 3 months at 40° C. under 75% humidity.

"Analogues derived from the peptide having an amino acid sequence of SEQ ID NO: 3" includes oxidant and/or dimer of the peptide having an amino acid sequence of SEQ ID NO: 3. Preferably, it means oxidant in this description.

"Oxidant" means the peptide having the sulfinic acid structure by oxidizing the thiol of cysteine constituting the peptide.

"W/O emulsion" or "water-in-oil emulsion" means dispersion of aqueous phase in oil phase.

"Weight ratio" indicates ratio of the target composition against the peptide in the composition. Especially, the ratio of the weight of the target composition when the weight of the peptide is to be 1.

"Adjuvant" enhances the level of immune response in body fluid or cell and lengthens response time. Therefore, frequency of injections and volume of the antigen containing the vaccine can be reduced, and the cost of vaccination can be reduced.

"Oxygen concentration" is the ml volume of oxygen contained in 100 mL of medium such as air. Its value is expressed in %.

"One dose vial" is a vial containing the composition for using for one administration. This means not only in the case of the whole quantity of composition in the vial, but also in the case of the partial quantity of composition in the vial.

The composition containing the peptide in the present invention can be used as a solution (example: injection) in which the peptide and the following additives are dissolved. In some cases, the liquid medium of the solution is dried to give as a solid preparation (example: lyophilized preparation). If it is a solid preparation, it is also possible to store the composition for a long time.

Examples of peptides included in the present invention include one or more peptides selected from peptides derived from DEPDC1, MPHOSPH1, URLC10, CDCA1 and KOC1 proteins. As the peptide derived from DEPDC1 protein, the peptide having an amino acid sequence EYYELFVNI (SEQ ID NOs: 1) is exemplified (Patent Document 1 (WO2008/047473)). As the peptide derived from MPHOSPH1 protein, the peptide having an amino acid sequence IYNEYIYDL (SEQ ID NOs: 2) is exemplified (Patent Document 1 (WO2008/047473)). As the peptide derived from URLC10 protein, the peptide having an amino acid sequence RYCNLEGPPI (SEQ ID NOs: 3) is exemplified (Patent Document 2 (WO2006/090810)). As the peptide derived from CDCA1 protein, the peptide having an amino acid sequence VYGIRLEHF (SEQ ID NOs: 4) is exemplified (Patent Document 3 (WO2009/153992)). As the peptide derived from KOC1 protein, the peptide having an amino acid sequence KTVNELQNL (SEQ ID NOs: 5) is exemplified (Patent Document 2 (WO2006/090810)). Moreover, one or more amino acids in the amino acids of these peptides can be substituted, deleted or added, or those one or two amino acids can be substituted.

The second amino acid from the N-terminus in the peptides of the present invention is preferably phenylalanine, tyrosine, methionine, tryptophan or threonine, and/or the C-terminal amino acid is phenylalanine, leucine, isoleucine, tryptophan or methionine.

The peptide in the present invention is especially preferably five kinds of peptides consisting of an amino acid sequence selected from SEQ ID NOs: 1 to 5

A content of peptides in the present formulation for one dose vial, regardless of formulation type such as solution formulation, lyophilized formulation and the like, is preferably 1.0 to 20 mg, more preferably 2.0 to 15 mg, further preferably 5.0 to 14 mg, especially preferably 10 to 13 mg, more preferably 12 mg. When five kinds of peptides are contained in one dose vial, a content of peptides is preferably 9 to 13 mg, especially preferably 10 to 12 mg.

Or when the total amount is 2.0 g by dissolving the composition with water (example: distilled water, purified water, physiological saline and the like), the concentration of the peptides is preferably 0.05 to 1.0% by weight, further preferably 0.1 to 1.0% by weight, more preferably 0.3 to 1.0% by weight, further preferably 0.4 to 0.8% by weight, especially preferably 0.6% by weight. When five kinds of peptides are contained in one dose vial, the concentration of peptides is preferably 0.45 to 0.65% by weight, especially preferably 0.5 to 0.6% by weight.

In the invention, a saccharide, those described in Japanese Pharmacopoeia, Japanese Pharmaceutical Codex, Japanese Pharmaceutical Excipients or the like, may be used. For example, monosaccharides (glucose, fructose, ribose, xylose, mannose, maltotriose), disaccharides (lactose, cellobiose, purified sucrose, maltose, trehalose and the like), trisaccharides (raffinose and the like), sugar alcohols (D-sorbitol, inositol, D-mannitol, and the like), polysaccharides (dextrin, dextran, chondroitin sulfate, hyaluronic acid, dextrin sulfate and the like) and salts thereof (sodium chondroitin sulfate, sodium hyaluronate and the like), cyclic sugars (cyclodextrin, branched cyclodextrin and the like), sodium alginate and the like can be used. Preferably, the saccharide is one or more selected from the group consisting of monosaccharide, disaccharides and polysaccharide. More preferably, the saccharide is one or more selected from the group consisting of glucose, galactose, fructose, sucrose, lactose, maltose, trehalose, dextran and glycerol. Especially preferably, the saccharide is sucrose.

A content of saccharide in the present formulation for one dose vial, regardless of formulation type such as solution formulation, lyophilized formulation and the like, is preferably 20 to 70 mg, more preferably 40 to 70 mg, further preferably 50 to 70 mg, more preferably 55 to 65 mg, especially preferably 60 mg.

Or the weight ratio of the peptide and the saccharide in the lyophilized composition is preferably 1:1.7 to 1:29.2, further preferably 1:3.3 to 1:5.8, more preferably 1:4.2 to 1:5.8, further preferably 1:4.6 to 1:5.4, especially preferably 1:5.

Or when the total amount is 2.0 g by dissolving the composition with water (example: distilled water, purified water, physiological saline and the like), the concentration of the saccharide is preferably 1.0 to 3.5% by weight, further preferably 2.5 to 3.5% by weight, more preferably 2.8 to 3.2% by weight, further preferably 2.9 to 3.1% by weight, especially preferably 3.0% by weight.

When the content of saccharide in the present formulation is too high or too low, stability of the peptides deteriorate and impurities derived from peptides (especially, analogue derived from a peptide consisting of an amino acid sequence of SEQ ID NO: 3) may be increased. Therefore, the content of the saccharide in the formulation is preferably in the above range.

The inorganic salt in the present invention is preferably one or more selected from the group consisting of sodium chloride, potassium chloride, magnesium chloride, sodium sulfite and sodium metabisulfite, more preferably sodium chloride.

A content of inorganic salt in the present formulation for one dose vial, regardless of formulation type such as solution formulation, lyophilized formulation and the like, is preferably 0.1 to 3.0 mg, more preferably 1.0 to 3.0 mg, further preferably 1.5 to 2.5 mg, especially preferably 2.0 mg.

Or the weight ratio of the peptide and the inorganic salt in the lyophilized composition is preferably 1:0.008 to 1:1.25, further preferably 1:0.083 to 1:0.25, more preferably 1:0.125 to 1:0.208, especially preferably 1:0.17.

Or when the total amount is 2.0 g by dissolving the composition with water (example: distilled water, purified water, physiological saline and the like), the concentration of the inorganic salt is preferably 0.01 to 0.3% by weight, further preferably 0.05 to 0.2% by weight, more preferably 0.05 to 0.15% by weight, especially preferably 0.1% by weight.

When the amount of the inorganic salt contained in the composition of the present invention is lower than the above range, the stability of the peptide is reduced and the amount of impurities derived from the peptide may be increased, especially the analogues derived from the peptide having an amino acid sequence of SEQ ID NO: 3 may be increased.

On the other hand, when the amount of the inorganic salt contained in the composition of the present invention exceeds the above range, poor freeze-drying occurs and the shape of the lyophilized product (cake) becomes bad when the composition of the present invention is freeze-dried. Therefore, the amount of the inorganic salt in the composition is preferably in the above range.

In the compositions of the present invention, pH control agents, those described in Japanese Pharmacopoeia, Japanese Pharmaceutical Codex, Japanese Pharmaceutical Excipients or the like, may be used. For example, carbonic acid, acetic acid, oxalic acid, citric acid, phosphoric acid, hydrochloric acid, sodium hydroxide, arginine, lysine and salts thereof, meglumine and the like can be used. Preferably, hydrochloric acid and sodium hydroxide can be used. The amount of these pH adjusting agents in the composition may be any amount as long as it can be adjusted to a predetermined pH value.

The pH is measured according to the pH measurement method described in the general test method of the Japanese Pharmacopoeia. The pH value is measured with a pH meter (HORIBA pH METER F-52) manufactured by HORIBA Ltd. with the range of 20° C. to 25° C.

When the present lyophilized composition is dissolved in water (example: distilled water, purified water, physiological saline and the like), pH of the solution is preferably 7.0 to 9.5, more preferably 8.0 to 9.5, further preferably 8.2 to 9.0, especially preferably 8.4 to 8.6.

When the pH value in the composition in the solution condition of the present invention is higher than the above range, the stability of the peptide is reduced and the amount of impurities derived from the peptide, especially the analogues derived from the peptide having an amino acid sequence of SEQ ID NO: 3 may be increased.

On the other hand, when the pH value in the composition in the solution condition of the present invention is lower than the above range, the solubility of the peptide contained in the composition of the present invention decreases and deposited peptide may appear. Especially, the peptides having an amino acid sequence of SEQ ID NO: 1, SEQ ID NO: 2 or SEQ ID NO: 4 may have low solubility in lower pH below the above range and they may become deposited.

The most suitable composition of the present invention is a composition wherein the saccharide is sucrose and the inorganic salt is sodium chloride.

The most preferable composition of the present invention comprises a peptide having the amino acid sequence represented by SEQ ID NO: 1, a peptide having the amino acid sequence represented by SEQ ID NO: 2, a peptide having the amino acid sequence represented by SEQ ID NO: 3, a peptide having the amino acid sequence represented by SEQ ID NO: 4, a peptide having the amino acid sequence represented by SEQ ID NO: 5, sucrose, and sodium chloride.

A further preferable composition of the present invention comprises 1.0 to 2.4 mg of the peptide having the amino acid sequence represented by SEQ ID NO: 1, 1.0 to 2.4 mg of the peptide having the amino acid sequence represented by SEQ ID NO: 2, 1.0 to 2.4 mg of the peptide having the amino acid sequence represented by SEQ ID NO: 3, 1.0 to 2.4 mg of the peptide having the amino acid sequence represented by SEQ ID NO: 4, 1.0 to 2.4 mg of a peptide having an amino acid sequence represented by SEQ ID NO: 5, 30 to 60 mg of sucrose and 1 to 2 mg of sodium chloride.

For example, the composition is a solution formulation, a lyophilized formulation, an emulsion formulation or the like. Preferably, it is a lyophilized preparation. For example, the lyophilization is carried out according to a known method by a freeze dryer (manufactured by Kyowa Vacuum Engineering Co., Ltd.).

When the present composition is a lyophilized formulation, the peptide(s) is(are) dissolved in water such as distilled water, purified water, preferable purified water for injection, physiological saline or the like to be the concentration of one type of peptide is 2.0 mg/ml (10 mg/ml when 5 kinds of peptides are contained), and the resulting mixture is mixed with an oil phase such as an adjuvant to prepare a water-in-oil (W/O) emulsion. For mixing the aqueous phase and the oil phase, it is preferable to use the device described in WO2013/133209A.

The present composition is oral drug or injectable drug but preferably injectable drug.

The concentration of oxygen in a vial in the case of the present composition is encapsulated into the vial is preferably 0.01% or more and less than 3.0%, more preferably 0.01% or more and less than 2.0%, further preferably 0.01% or more and less than 1.5%, especially preferably 0.01% or more and less than 1.0%.

When the concentration of oxygen in the vial is higher than the above range, the stability of the peptides deteriorate and the amount of impurities derived from peptides may increase, especially a peptide consisting of an amino acid sequence of SEQ ID NO: 3). Therefore, the stability of a peptide consisting of an amino acid sequence of SEQ ID NO: 3) deteriorates under the presence of oxygen.

The concentration of oxygen in a vial can be maintained in the above range over a long duration when the vial for freeze-dried formulation of the present invention is preserved hermetically with bag such as aluminum pouch.

The concentration of oxygen can be measured non-destructively by irradiation of laser to the gas in the vial and by monitoring of the amount of absorption using non-destructive headspace-analyzer (manufactured by Lighthouse Instruments and the like).

The present invention provides a kit including any one of (a) freeze-dried formulation of composition of the present invention, (b) reconstructed solution consisting of freeze-dried formulation of composition of the present invention or (c) water-in-oil emulsion formulation mixing reconstructed solution consisting of freeze-dried formulation of composition of the present invention and an adjuvant.

The composition of the present invention included as freeze-dried formulation in a kit of the present invention may be any one of the composition above.

The present invention provides a method of manufacturing the lyophilized formulation which comprises at least the following steps:
  a) a step of mixing the stable peptides, the saccharide and the inorganic salt in a solution of pH 12.0 or more and less than pH 13.0,
  b) a step of adjusting the solution prepared by said step a) to pH 10.0 or more and less than pH 12.0,
  c) a step of mixing the less stable peptides in the solution prepared by said step b),
  d) a step of adjusting the solution prepared by said step c) to pH 7.0 or more and less than pH 9.0, and
  e) a step of lyophilizing the mixture prepared by said step d).

In other embodiment, the present invention provides a method of manufacturing the lyophilized formulation which comprises at least the following steps:
  a) a step of mixing a peptide consisting of an amino acid sequence of SEQ ID NO: 1, a peptide consisting of an amino acid sequence of SEQ ID NO: 4, sucrose and sodium chloride in a solution of pH 12.0 or more and less than pH 13.0,
  b) a step of adjusting the solution prepared by said step a) to pH 10.0 or more and less than pH 12.0 with an acid substance,
  c) a step of mixing a peptide consisting of an amino acid sequence of SEQ ID NO: 2, a peptide consisting of an amino acid sequence of SEQ ID NO: 3 and a peptide consisting of an amino acid sequence of SEQ ID NO: 5 to the solution prepared by said step b),
  d) a step of adjusting the solution prepared by said step c) to pH 7.0 or more and less than pH 9.0 with an acid substance, and
  e) a step of lyophilizing the mixture prepared by said step d).

Moreover, the present invention provides a method of manufacturing the lyophilized formulation which comprises at least the following steps:
  a) a step of mixing a peptide consisting of an amino acid sequence of SEQ ID NO: 1, a peptide consisting of an amino acid sequence of SEQ ID NO: 4, sucrose and sodium chloride in a solution of pH 12.0 or more and less than pH 13.0,
  b) a step of adjusting the solution prepared by said step a) to pH 11.0 or more and less than pH 12.0 with an acid substance,
  c) a step of mixing a peptide consisting of an amino acid sequence of SEQ ID NO: 2 and a peptide consisting of an amino acid sequence of SEQ ID NO: 3 to the solution prepared by said step b),
  d) a step of adjusting the solution prepared by said step c) to pH 9.0 or more and less than pH 11.0 with an acid substance,
  e) a step of mixing a peptide consisting of an amino acid sequence of SEQ ID NO: 5 to the solution prepared by said step d),
  f) a step of adjusting the solution prepared by said step c) to pH 7.0 or more and less than pH 9.0 with an acid substance, and
  g) a step of lyophilizing the mixture prepared by said step f).

The solution of pH 12.0 or more and less than pH 13.0 of above step a), the solution of pH 10.0 or more and less than pH 12.0 of above step b), and the solution of pH 7.0 or more and less than pH 9.0 of above step d) are able to be adjusted by pH adjustment agents.

The present invention also provides a method of preparing the lyophilized formulation including a step of controlling to 0.01% or more and less than 3.0% of the oxygen concentration in a vial of the lyophilized formulation obtained from above final step. This step can increase stability of the peptide (especially, the peptide represented by the amino acid sequence of SEQ ID NO: 3).

The present invention also provides a lyophilized formulation prepared by above preparation method of the lyophilized formulation.

The present invention also provides a composition comprising a peptide consisting of an amino acid sequence of SEQ ID NO: 3, or an amino acid sequence in which one or two amino acid(s) may be substituted, deleted or added in the amino acid sequence of SEQ ID NO: 3, and the oxygen concentration is 0.01% or more and less than 3.0% in the vial.

As the peptide consisting of an amino acid sequence of SEQ ID NO: 3, the analogues derived from the peptide having an amino acid sequence of SEQ ID NO: 3 may be increased when the oxygen concentration is 3.0% or more. Therefore, the peptide having an amino acid sequence of SEQ ID NO: 3 is preferably conserved under low oxygen concentration conditions since the peptide is affected by oxygen.

The composition of the present invention obtained under the above condition is excellent in stability in long term storage. Therefore, the composition of the present invention is useful for a formulation that exerts a stable medicinal effect with excellent storage stability.

EXAMPLES

The present invention will be described in more detail with reference to, but not limited to, the following Examples, Reference Examples and Test Examples.
(Method of Manufacturing the Bulk Formulation for Injection)

625 g of 1 mol/L sodium hydroxide solution was added in 8987.5 g of water for injection, and 375 g of sucrose and 12.5 g of sodium chloride were dissolved. Next, 16.7 g of the peptide described as SEQ ID NO: 1 and 17.7 g of the peptide described as SEQ ID NO: 4 were dissolved. Then, pH of the prepared solution was adjusted to 11.5 with hydrochloride solution, and 15.9 g of the peptide described as SEQ ID NO: 2 and 16.5 g of the peptide described as SEQ ID NO: 5 and 16.9 g of the peptide described as SEQ ID NO: 3 were dissolved. Then, pH of the prepared solution was adjusted to 8.4-8.6 with hydrochloride solution, and the total solution weight was adjusted to 12500 g by adding water for injection. Sterile filtration was performed for the prepared solution described above, 2.0 g of the solution was dispensed into 3 mL glass vial in each, and the dispensed vials were lyophilized.

(Stability Test of the Lyophilized Sample)

The lyophilized sample described above was sealed with the glass vial and stored at 25° C.60% RH or 40° C.75% RH for the specified period. Then, appearance, contents, and related substances of the sample were evaluated.

(Analytical Procedure of Content and Related Substances)

Content and related substances were measured in accordance with the method of liquid chromatography described in general test section in Japan Pharmacopeia. To prepare the test sample, water for injection was added to the lyophilized sample, and each peptide concentration was adjusted to 0.12 mg/mL. Peak area of each peptide in the sample and the one in each standard of the drug substance were obtained, and content was calculated from dilution ratio and ratio of peak area in the sample to one in each standard described below. Residual of the content in the stability test was against the content at the time when the lyophilized sample was prepared. Related substances were calculated by ratio of peak area of the target related substance to all related substances and drug substances in each sample solution. The level of increase of the related substances was evaluated by the difference from the related substance at the moment when the lyophilized sample was prepared.

(Test Condition of High Performance Liquid Chromatography)

Standard solution for measuring content of the peptide described as SEQ ID NO: 1 or SEQ ID NO: 2 was prepared in each by dissolving the peptide described above into 1.6 mg/mL phosphate solution and by adjusting each peptide concentration into 0.15 mg/mL. Standard solution for measuring content of the peptide described as SEQ ID NO: 3, SEQ ID NO: 4 or SEQ ID NO: 5 was prepared in each by dissolving the peptide described above into 12.1 mg/mL of 2-amnino-2-hydroxymethyl-1,3-propanediol aqueous solution and by adjusting each peptide concentration to 0.15 mg/mL. For the stationary phase of the liquid chromatography, column with octadecyl group was used, and the measurement was performed by gradient elution method. Flow rate in the measurement was set to 1.0 mL/min.

Example 1

(Solubility Study 1 of Each Peptide Against Solution pH)

Solubility of the peptides described as SEQ ID NOs: 1-5 was evaluated with the condition of pH 2-12. Hydrochloride solution or sodium hydroxide solution was added to water for injection to adjust pH, and each peptide was mixed with the adjusted solution, where the peptide concentration was set to 3 mg/mL. The mixed solution was filtered, the filtered solution was diluted with 10-20 parts of water for injection, and peak area of each peptide was obtained by liquid chromatography (same test procedure described above). From peak area of each peptide, dilution ratio of the filtered solution, peak area and concentration of each standard solution described above, peptide concentration was obtained. Solubility of each peptide against pH was shown in FIG. 1. It was observed that solubility of the peptides described as SEQ ID NO: 1 and SEQ ID NO: 2 decreased with decreasing pH of the solution. Solubility of the peptides described as SEQ ID NO: 4 was low when solution pH was around neutral.

(Solubility Study 2 of Each Peptide Against pH)

As shown in the study 1 described above, when the peptide was mixed directly with water for injection, the bulk was formed, and it was difficult to dissolve the bulk. So, solubility of peptides was evaluated thermodynamically by dissolving the peptide completely once with high pH, and decreasing the solution pH gradually to check pH when white turbidity was observed.

The peptide described as SEQ ID NO: 1 or SEQ ID NO: 2 was dissolved into the solution with pH10 and solubility was examined by decreasing the solution pH in each. 15 mg of the peptide described as SEQ ID NO: 1 or SEQ ID NO: 2 was mixed with water, 0.1 mol/L sodium hydroxide solution was added for dissolution, and pH was adjusted to 10. Peptide concentration was adjusted to 1.5 mg/g. In each sample solution, hydrochloride solution was added to decrease pH gradually, and the appearance of the solution was checked. In the peptide described as SEQ ID NO: 1, when pH of the solution was 5.6 or below, white turbidity was observed in the solution (Table 1-1). In the peptide described as SEQ ID NO: 2, when pH of the solution was 5.5 or below, white turbidity was observed in the solution (Table 1-2).

TABLE 1-1

| pH | 10 | 7.9 | 6.6 | 6 | 5.6 | 5.4 |
|---|---|---|---|---|---|---|
| Solution state | ○ | ○ | ○ | ○ | ○ | x |

○: dissolution,
x: white turbidity

TABLE 1-2

| pH | 10 | 9 | 8 | 7 | 5.5 | 5 |
|---|---|---|---|---|---|---|
| Solution state | ○ | ○ | ○ | ○ | ○ | x |

○: dissolution,
x: white turbidity

Example 2

(Solution Stability of each Peptide Against pH)

Stability of the peptide described as SEQ ID NOs: 1-5 was evaluated in each. Compositions of each sample were shown in Table 2.

TABLE 2

| Formation | Example 2-1 | Example 2-2 | Example 2-3 | Example 2-4 |
|---|---|---|---|---|
| peptide (SEQ ID NO: 1) | 1.2 | 1.2 | 1.2 | 1.2 |
| peptide (SEQ ID NO: 2) | 1.2 | 1.2 | 1.2 | 1.2 |
| peptide (SEQ ID NO: 3) | 1.2 | 1.2 | 1.2 | 1.2 |
| peptide (SEQ ID NO: 4) | 1.2 | 1.2 | 1.2 | 1.2 |
| peptide (SEQ ID NO: 5) | 1.2 | 1.2 | 1.2 | 1.2 |
| Sucrose | 15 | 15 | 15 | 15 |
| Sodium hydroxide | 2 | 2 | 2 | 2 |
| Hydrochloric acid aq. sol. | proper quantity | proper quantity | proper quantity | proper quantity |
| pH | 8 | 9 | 10 | 11 |

(mg/g)

The sample solution prepared with the compositions above was stored for 6 hours at 25° C. Then, the level of increase of related substances derived from the peptides described as SEQ ID NO: 1, SEQ ID NO: 2 or SEQ ID NO: 3 was measured in each, and residual of the peptides described as SEQ ID NO: 4 or SEQ ID NO: 5 was measured in each. The analytical procedure for the related substances and peptide contents was described above. The results were shown in FIGS. 2-1-2-5. It was found that related substances derived from the peptide described as SEQ ID NO: 1 were not obviously influenced by pH change and solution stability was consistently high (FIG. 2-1). Related substances derived from the peptide described as SEQ ID NO: 2 increased and solution stability decreased with increasing solution pH (FIG. 2-2). Related substances derived from the peptide described as SEQ ID NO: 3 increased and solution stability decreased, when solution pH was 10.0-11.0 (FIG. 2-3). Residual of the peptide described as SEQ ID NO: 4 was not obviously influenced by pH change and the solution stability was consistently high (FIG. 2-4). Residual of the peptide described as SEQ ID NO: 5 prominently decreased and solution stability decreased with increasing solution pH (FIG. 2-5).

Example 3

(Study on Stabilizing Effect by Sugars)

Sugars, sucrose, trehalose, glucose, dextran, or glycerin were added in the sample, and we examined which sugars were effective for increasing stability. Compositions of each sample were shown in Table 3.

TABLE 3

| Formation | Example 3-1 | Example 3-2 | Example 3-3 | Example 3-4 | Example 3-5 | Example 3-6 |
|---|---|---|---|---|---|---|
| peptide (SEQ ID NO: 1) | 1.2 | 1.2 | 1.2 | 1.2 | 1.2 | 1.2 |
| peptide (SEQ ID NO: 2) | 1.2 | 1.2 | 1.2 | 1.2 | 1.2 | 1.2 |
| peptide (SEQ ID NO: 3) | 1.2 | 1.2 | 1.2 | 1.2 | 1.2 | 1.2 |
| peptide (SEQ ID NO: 4) | 1.2 | 1.2 | 1.2 | 1.2 | 1.2 | 1.2 |
| peptide (SEQ ID NO: 5) | 1.2 | 1.2 | 1.2 | 1.2 | 1.2 | 1.2 |
| Sucrose | 15 | — | — | — | 15 | 15 |
| Trehalose | — | 15 | — | — | — | — |
| Glucose | — | — | 15 | — | — | — |
| Dextran | — | — | — | 15 | — | — |
| Glycerol | — | — | — | — | 0.75 | — |
| L-Arginine | 12 | 12 | 12 | 12 | 12 | — |
| Sodium hydroxide | — | — | — | — | — | 2 |
| Hydrochloric acid aq. sol. | proper quantity | proper quantity | proper quantity | proper quantity | proper quantity | proper quantity |

(mg/g)

Each sample was prepared with the concentration in Table 3, pH was adjusted to 8 with hydrochloride solution, and 2.5 g of each solution shown in Table 3 was dispensed into 3 mL vial. The dispensed vials were lyophilized.

The lyophilized sample was stored for 2 weeks at 40° C.75% RH, and the level of increase of the related substances derived from the peptide described as SEQ ID NO: 3 after storage was measured against the ones when the lyophilized sample was prepared. The results were shown in FIG. 3. From the results, it was found that sucrose was the most effective for stabilizing formulations of the peptide mixtures, as the level of increase of the related substances was the lowest.

Example 4

(Stabilization Study with Different Amounts of Sugars)

We examined if amounts of sucrose contained in the sample had impact on formulation stability of the peptide mixture. Compositions of each sample were shown in Table 4.

TABLE 4

| Formation | Example 4-1 | Example 4-2 | Example 4-3 | Example 4-4 |
|---|---|---|---|---|
| peptide (SEQ ID NO: 1) | 1.2 | 1.2 | 1.2 | 1.2 |
| peptide (SEQ ID NO: 2) | 1.2 | 1.2 | 1.2 | 1.2 |
| peptide (SEQ ID NO: 3) | 1.2 | 1.2 | 1.2 | 1.2 |
| peptide (SEQ ID NO: 4) | 1.2 | 1.2 | 1.2 | 1.2 |
| peptide (SEQ ID NO: 5) | 1.2 | 1.2 | 1.2 | 1.2 |
| Sucrose | 15 | 30 | 30 | 50 |
| Sodium chloride | — | — | 1 | 1 |
| Sodium hydroxide | 2 | 2 | 2 | 2 |
| Hydrochloric acid aq. sol. | proper quantity | proper quantity | proper quantity | proper quantity |

(mg/g)

Each sample was prepared with the concentration in Table 4, and pH was adjusted to 8.5 with hydrochloride solution. 2.0 g of each solution shown in Table 3 was dispensed into 3 mL vial, and the dispensed vials were lyophilized. The lyophilized sample was stored for 3 months at 40° C.75% RH, and the level of increase of the related substances derived from the peptide described as SEQ ID NO: 3 after storage was measured against the ones when the lyophilized sample was prepared. The results were shown in FIG. 4. From the results, it was found that when sucrose amount was 60 mg for a vial (30 mg/g as concentration of the solution), the level of increase of the related substances was lower than any others, and that the amount of sucrose impacted the stabilization of the formulation of the peptide mixtures.

Example 5

(Stabilization Study with Different Concentrations of Inorganic Salts)

It was examined which amount of sodium chloride is more effective for stabilization of the peptide mixtures. The compositions are described in Table 5-1.

TABLE 5-1

| Formation | Example 5-1 | Example 5-2 | Example 5-3 |
|---|---|---|---|
| peptide (SEQ ID NO: 1) | 1.2 | 1.2 | 1.2 |
| peptide (SEQ ID NO: 2) | 1.2 | 1.2 | 1.2 |
| peptide (SEQ ID NO: 3) | 1.2 | 1.2 | 1.2 |
| peptide (SEQ ID NO: 4) | 1.2 | 1.2 | 1.2 |
| peptide (SEQ ID NO: 5) | 1.2 | 1.2 | 1.2 |
| Sucrose | 30 | 30 | 30 |

TABLE 5-1-continued

| Formation | Example 5-1 | Example 5-2 | Example 5-3 |
|---|---|---|---|
| Sodium chloride | — | 1 | 2 |
| Sodium hydroxide | 2 | 2 | 2 |
| Hydrochloric acid aq. sol. | proper quantity | proper quantity | proper quantity |

(mg/g)

The above compositions were mixed according to the Table 5-1, each solution was adjusted to pH 8.5 with hydrochloric acid aqueous solution, and 2.0 g of the resultant solution was dispensed into a 3 mL glass vial and lyophilized.

The prepared lyophilized products were stored at 40° C.75% RH for 3 months, and the level of increase of the related substances derived from the peptide described as SEQ ID NO: 3 was measured. The results are shown in FIG. 5. From the results, it was found that the composition that contains 4.0 mg of sodium chloride per vial (2.0 mg/g as concentration of the solution) contributes to stabilization of the peptide mixtures better because the level of increase of the related substances was smaller.

(Study About Appearance of Lyophilized Products with Different Concentrations of Inorganic Salt)

Inappropriate lyophilizing conditions cause shrinking of the lyophilized products (cakes) and the cakes with bad shape become defective products. Therefore, effect of amount of sodium chloride in the compositions on shrinking of the lyophilized products was examined. The products which contain 2 mg (as 1.0 mg/g concentration of solution) or 4 mg (as 2.0 mg/g concentration of solution) of sodium chloride per vial (examples 5-2 and 5-3) were prepared and lyophilized with the same condition. The number of the prepared samples was 827 vials and 809 vials respectively, and 1636 vials in total. The appearance of the lyophilized products is shown in Table 5-2, typical lyophilized cakes are shown in FIG. 5-2 and FIG. 5-3. FIG. 5-2 is the photo of the product which contains 1 mg/g of sodium chloride and has no shrinking. FIG. 5-3 is the photo of the product which contains 2 mg/g of sodium chloride and was completely shrunken. From the results, it was found that the composition that contains 2 mg of sodium chloride per vial (1.0 mg/g as concentration of the solution) is more appropriate for lyophilization in terms of appearance of the products because the number of the completely shrunken product was less.

TABLE 5-2

| Concentration of sodium chloride | 1 mg/g | 2 mg/g |
|---|---|---|
| complete shrunken shape | 0 | 725 |
| shrink a little | 648 | 58 |
| no shrink | 179 | 26 |

(vials)

From the above studies on stability of the peptide mixtures and appearance of the lyophilized products with different concentrations of sodium chloride, it was concluded that 2.0 mg of sodium chloride per vial (1.0 mg/g as concentration of the solution) is the best.

Example 6

(Stabilization Study with Different pH of the Solution to be Lyophilized)

It was examined which pH of the solution of the composition is more effective for stabilization of the peptide mixtures. The compositions are described in Table 6.

TABLE 6

| Formation | |
|---|---|
| peptide (SEQ ID NO: 1) | 1.2 |
| peptide (SEQ ID NO: 2) | 1.2 |
| peptide (SEQ ID NO: 3) | 1.2 |
| peptide (SEQ ID NO: 4) | 1.2 |
| peptide (SEQ ID NO: 5) | 1.2 |
| Sucrose | 15 |
| Sodium hydroxide | 2 |
| Hydrochloric acid aq. sol. | proper quantity |

(mg/g)

The above composition was mixed according to the Table 6 and adjusted to pH 8.0, 8.5, 9.0 or 9.5 with hydrochloric acid aqueous solution, and 2.0 g of the resultant solution was dispensed into a 3 mL glass vial and lyophilized.

The prepared lyophilized products were stored at 25° C.60% RH for 3 months, and the level of increase of the related substances derived from the peptide described as SEQ ID NO: 3 was measured. The results are shown in FIG. 6. From the results, it was found that the formulation of which solution pH is 8.0 contributes to stabilization of the peptide mixtures because the level of increase of the related substances is smaller.

From the above studies on stability in solution and solubility of each peptide with different pH, it was concluded that pH 8.5 is the best as pH of the solution of the peptides. It was decided that peptides are to be dissolved in the following order; peptides which has good stability in the solution state (the peptides described as SEQ ID NO: 1 and SEQ ID NO: 4) first, then peptides which have poor stability in the solution state (the peptides described as SEQ ID NOs: 2, 5 and 3). The peptides which have good stability in the solution state should be dissolved preferably in the order of the peptide described as SEQ ID NO: 1 and the peptide described as SEQ ID NO: 4. And it was concluded that the peptides which have poor stability in the solution state should be dissolved preferably in the order of peptides described as SEQ ID NOs: 2, 5 and 3.

Example 7

(Study on the Effect of Oxygen Concentration in the Vials on the Amount of Related Substances)

Stability of lyophilized products of peptides was examined by measuring oxygen concentration in the vials of the products which contain the peptide described as SEQ ID NO: 3. The composition of the lyophilized products is described in Table 7-1.

TABLE 7-1

| Formation | |
|---|---|
| peptide (SEQ ID NO: 3) | 2.0 |
| Sodium dihydrogenphosphate | 0.83 |
| Disodium phosphate dodecahydrate | 33.92 |
| Sucrose | 25 |

(mg/g)

The lyophilized products were stored at 25° C. for 3 months, oxygen concentration in the vials was measured with a non-destructive headspace analyzer and the related substances derived from the peptide described as SEQ ID NO: 3 were measured. The results are shown in Table 7-2. From the results, it was found that the lower the oxygen concentration, the less the level of increase of related substances derived from the peptide described as SEQ ID NO: 3. Therefore it was concluded that oxygen concentration in the vials should preferably be less than 3.0% in terms of stability.

TABLE 7-2

|  | Example 7-1 | Example 7-2 | Example 7-3 | Reference example 7-1 | Reference example 7-2 | Reference example 7-3 |
|---|---|---|---|---|---|---|
| Oxygen concentration (%) | 0.213 | 0.448 | 0.963 | 3.407 | 8.131 | 18.173 |
| Increase level of the analogues (%) | 0.21 | 0.19 | 0.70 | 1.84 | 2.66 | 3.88 |

INDUSTRIAL APPLICABILITY

The present invention is useful for a composition including peptides, especially a peptide vaccine formulation including peptides for treatment of cancer.

The invention claimed is:

1. A method of manufacturing a lyophilized formulation, wherein the method comprises:
   a) mixing a first peptide consisting of the amino acid sequence of SEQ ID NO: 1, a second peptide consisting of the amino acid sequence of SEQ ID NO: 4, sucrose, and sodium chloride in a solution of pH 12.0 to pH 13.0;
   b) adjusting the pH of the solution prepared by said step a) to pH 10.0 to pH 12.0 with an acid substance;
   c) adding a third peptide consisting of the amino acid sequence of SEQ ID NO: 2, a fourth peptide consisting of the amino acid sequence of SEQ ID NO: 3 and a fifth peptide consisting of the amino acid sequence of SEQ ID NO: 5 to the solution prepared by said step b);
   d) adjusting the pH of the solution prepared by said step c) to pH 7.0 to pH 9.0 with an acid substance; and
   e) lyophilizing the solution prepared by said step d).

2. The method according to claim 1, wherein the lyophilized formulation prepared by step e) is stored in a vial, and wherein the method further comprises controlling the oxygen concentration to 0.01% to 3.0% in the vial.

3. A method of manufacturing a lyophilized formulation, wherein the method comprises:
   a) mixing a first peptide consisting of the amino acid sequence of SEQ ID NO: 1, a second peptide consisting of the amino acid sequence of SEQ ID NO: 4, sucrose, and sodium chloride in a solution of pH 12.0 to pH 13.0;
   b) adjusting the pH of the solution prepared by said step a) to pH 11.0 to pH 12.0 with an acid substance;
   c) adding a third peptide consisting of the amino acid sequence of SEQ ID NO: 2 and a fourth peptide consisting of the amino acid sequence of SEQ ID NO: 3 to the solution prepared by said step b);
   d) adjusting the pH of the solution prepared by said step c) to pH 9.0 to pH 11.0 with an acid substance;
   e) adding a fifth peptide consisting of the amino acid sequence of SEQ ID NO: 5 to the solution prepared by said step d);
   f) adjusting the solution prepared by said step e) to pH 7.0 to pH 9.0 with an acid substance; and
   g) lyophilizing the mixturesolution prepared by said step f).

4. The method according to claim 3, wherein the lyophilized formulation prepared by step g) is stored in a vial, and wherein the method further comprises controlling the oxygen concentration to 0.01% to 3.0% in the vial.

* * * * *

SEQUENCE LISTING

<160> NUMBER OF SEQ ID NOS: 5

<210> SEQ ID NO 1
<211> LENGTH: 9
<212> TYPE: PRT
<213> ORGANISM: Homo sapiens

<400> SEQUENCE: 1

Glu Tyr Tyr Glu Leu Phe Val Asn Ile
1               5

<210> SEQ ID NO 2
<211> LENGTH: 9
<212> TYPE: PRT
<213> ORGANISM: Homo sapiens

<400> SEQUENCE: 2

Ile Tyr Asn Glu Tyr Ile Tyr Asp Leu
1               5

<210> SEQ ID NO 3
<211> LENGTH: 10
<212> TYPE: PRT
<213> ORGANISM: Homo sapiens

<400> SEQUENCE: 3

Arg Tyr Cys Asn Leu Glu Gly Pro Pro Ile
1               5                   10

<210> SEQ ID NO 4
<211> LENGTH: 9
<212> TYPE: PRT
<213> ORGANISM: Homo sapiens

<400> SEQUENCE: 4

Val Tyr Gly Ile Arg Leu Glu His Phe
1               5

<210> SEQ ID NO 5
<211> LENGTH: 9
<212> TYPE: PRT
<213> ORGANISM: Homo sapiens

<400> SEQUENCE: 5

```
Lys Thr Val Asn Glu Leu Gln Asn Leu
1               5
```